J. C. TAYLOR.
TIRE.
APPLICATION FILED JUNE 11, 1908.
942,149.
Patented Dec. 7, 1909.
2 SHEETS—SHEET 1.
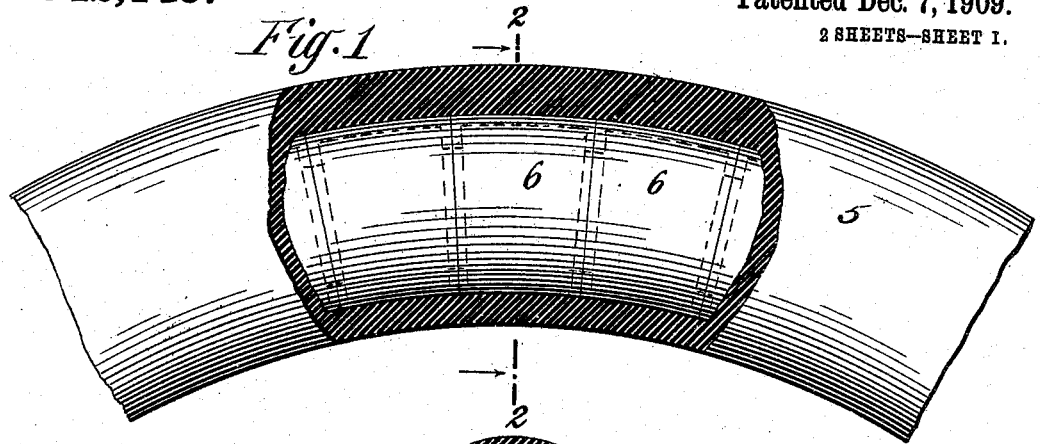
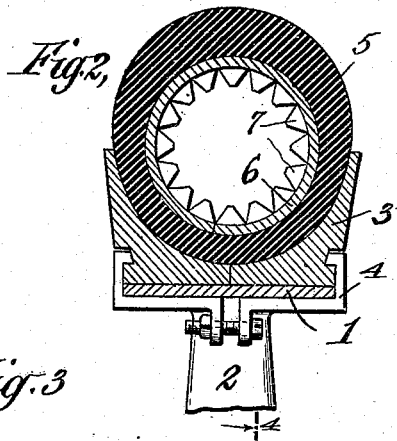
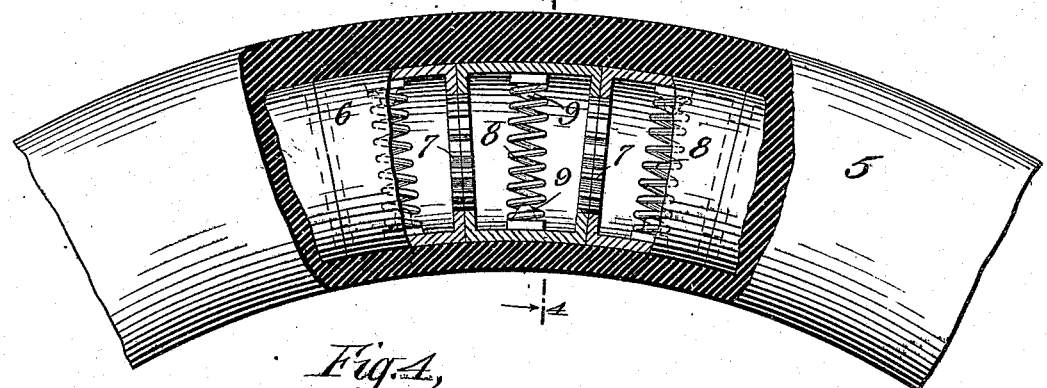
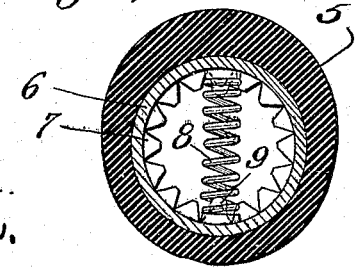
WITNESSES:
INVENTOR
Jos. C. Taylor
BY
ATTORNEY J. C. TAYLOR.
TIRE.
APPLICATION FILED JUNE 11, 1906.
942,149.
Patented Dec. 7, 1909.
2 SHEETS—SHEET 2.
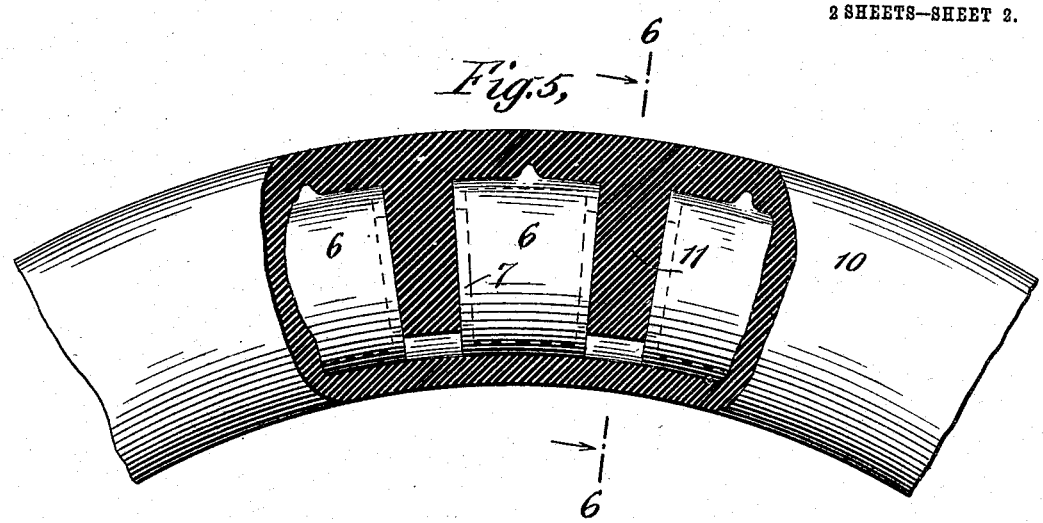
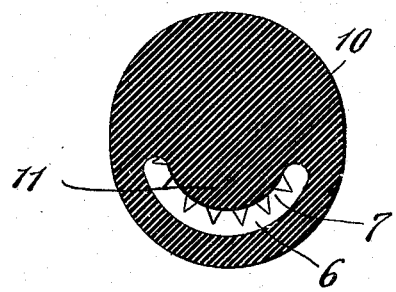
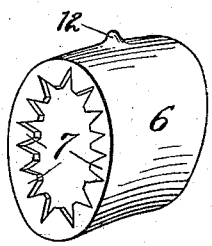
WITNESSES:
INVENTOR
Jos. C. Taylor
BY
J. P. Edmonds
ATTORNEY

UNITED STATES PATENT OFFICE.

JOSEPH C. TAYLOR, OF NEW YORK, N. Y.

TIRE.

942,149.  Specification of Letters Patent.  Patented Dec. 7, 1909.

Application filed June 11, 1906. Serial No. 321,209.

*To all whom it may concern:*

Be it known that I, JOSEPH C. TAYLOR, a citizen of the United States, residing in the borough of Brooklyn, city and State of New York, have invented certain new and useful Improvements in Tires, of which the following is a specification.

This invention concerns tires for the wheels of vehicles and the object of the invention is to provide a tire having the requisite strength and resiliency and which can be manufactured at small cost. This object is attained by the use of a resilient, non-inflatable, inner tube consisting of a plurality of metallic tube-sections. These sections of the inner tube are formed of sheet-metal and are of cylindrical form, they being either sections of a tube or sheet-metal punchings which are bent to bring their ends together. Each tube-section is of greatest width along a line directly underlying the tread of the tire and from this line they taper somewhat to the opposite side of the section so that when all are assembled side by side, the edges of adjacent tube-sections will be in engagement at all points. The tube-sections may have at their lateral edges integral inwardly-turned projections which hold the tube-sections against displacement, as for instance, preventing them from telescoping one within another. I prefer, however, to space the several tube-sections apart somewhat. In the preferred form of my invention I provide for this purpose integral depending portions formed on the inner side of the outer tube or shoe. Each of these portions extends down between a pair of adjacent tube-sections and holds them from moving around in the tube, the inwardly turned projections on the tube-sections preventing the edges thereof from cutting these spacing portions formed on the outer tube.

My invention will be better understood by reference to the accompanying drawings in which—

Figure 1 is a sectional elevation of a tire, Fig. 2 is a section on line 2—2 of Fig. 1, Figs. 3 and 4 are views similar to Figs. 1 and 2 illustrating a modification, Figs. 5 and 6 are views similar to Figs. 1 and 2 illustrating a further modification, and Fig. 7 is a perspective view of one of the inner tube sections.

Referring to these drawings, 1 indicates the rim of the wheel supported on spokes 2 and carrying the felly 3 which may be in two sections to facilitate positioning the tire thereon. These sections may be held together and on the rim by adjustable clamps 4. In the form of my invention illustrated in Fig. 1, the outer tube or shoe 5 of the tire may be of any of the forms now in common use; it may have ribs at the side adapted to enter grooves formed in the felly, or it may be of annular cross section and provided with an opening through which the parts of the metallic inner tube may be inserted, this opening being afterward sealed, if desired, as by vulcanizing. Preferably, however, the tire is constructed by assembling the inner tube-sections in proper relation and molding the outer tube thereon.

The inner tube consists of a plurality of cylindrical tube-sections 6 of sheet-metal. One of these sections is shown in perspective in Fig. 7. It may be formed from a metallic tube by cutting off a section of the tube which is of greater width on one side than on the other, this shape being desired so that when the sections are assembled side by side, as shown in Fig. 1, the edges of adjacent sections will be in contact at all points. At each end of a tube-section integral teeth 7 may be provided and these may be turned inwardly of the section. Instead of forming the tube-section from a tube, I may form it of a sheet-metal punching which is of greatest width at the center and which tapers in either direction from this line of greatest width. This blank may have teeth 7 formed along the lateral edges thereof and these may be turned at right angles to the blank and the latter bent to cylindrical form. This construction of tube-section is illustrated in Fig. 2. The tube-sections constructed in either of the two ways above described are assembled within the outer tube or shoe 5 forming an inner tube whose elasticity is dependent upon the elasticity of the metal parts and not upon inflation with air.

When it is desired to form the tube-sections of such light material that they will not possess sufficient strength, I may provide between opposite walls of each section one or more spiral springs 8 which help to resist an inward movement of the tread of the tire and the outer wall of the tube-section caused by an obstruction in the roadway and which press these parts out when the obstruction is passed. Such spring 8 may be located in position by bosses 9, formed on the opposite walls of the tube-section.

Referring now to Figs. 5 and 6, I will describe the form of my invention in which the sections of the inner tube are not arranged side by side but are spaced apart somewhat. The tube-sections 6 are of either of the two types above described, but the outer tube or shoe 10 has integral lugs 11 depending from the inner side thereof at regular intervals around its circumference. These lugs extend almost down to the inner wall of the shoe. Between each pair of adjacent lugs 11 a tube section 6 is inserted so as to be held in position thereby. The inwardly-turned teeth 7 at the ends of the tube-sections are useful with this construction of outer tube in order to prevent the edges of the tube-sections from cutting the lugs 11. As thus constructed the tire will have the requisite resiliency as the metallic tube-sections 6 will give under any strain and will spring back into place as soon as the strain is withdrawn. The lugs 11 help in resisting an abnormal strain such as will carry the ends thereof into engagement with the inner walls of the shoe 10, since they will permit of but a slight amount of inward movement of the tread of the tire after they have been moved into engagement with the inner side of the shoe 10. At a suitable point thereon, the metal of each of the inner tube sections may be raised to form a projection which will take into the material of the outer tube or shoe to prevent displacement of the tube-section. Such projections are shown (exaggerated as to size) in Figs. 5 and 7 at 12.

In addition to being inexpensive to construct this form of tire possesses the further advantage of resiliency obtained by mechanical means rather than of inflation by air and for this reason all delays and annoyances due to puncturing, are avoided.

Having described my invention, what I claim as new and desire to secure by Letters Patent is:—

1. A tire having an outer tube and a plurality of resilient, non-inflatable, metallic tube-sections therein, each of said tube-sections having a projection thereon coacting with the outer tube to hold the section against displacement, substantially as set forth.

2. A tire having an outer tube, a plurality of resilient, non-inflatable, metallic tube-sections therein spaced apart around the tube, and means lying between said sections for limiting the extent to which said tube may be depressed, each of said tube-sections having a projection thereon coacting with the outer tube to hold the section against displacement, substantially as set forth.

3. A tire having an outer tube and a plurality of resilient, non-inflatable, metallic tube-sections therein, said outer tube having a plurality of inwardly extending parts thereon limiting the extent to which it may be depressed and each of said sections having a projection thereon coacting with the outer tube to hold the section against displacement, substantially as set forth.

4. A tire having an outer tube, a plurality of resilient, non-inflatable, metallic tube-sections therein, each of cylindrical form and consisting of a single piece of metal, and projections integral with said tube extending inwardly of the tube a substantial distance spacing said sections apart and limiting the extent to which the outer tube may be depressed, substantially as set forth.

5. A tire having an outer tube, a plurality of resilient, non-inflatable, metallic tube-sections therein spaced apart around the tube, and means lying between said sections for limiting the extent to which said tube may be depressed, each of said sections consisting of a single piece of metal of cylindrical form and of greater width on the tread side than on the opposite side and each having integral inwardly-extending teeth at its ends, substantially as set forth.

6. A tire having an outer tube and a plurality of resilient, non-inflatable, metallic tube-sections therein, said outer tube having a plurality of parts integral therewith extending inwardly of the tube a substantial distance lying between said sections and spacing the sections apart, and the end of each of said parts being normally separated from the opposite wall of the tube by open space but adapted to coact with said wall to limit the extent to which said tube may be depressed, substantially as described.

7. A tire having an outer tube, a plurality of resilient, non-inflatable, substantially cylindrical, metallic tube-sections therein, and means integral with said tube and extending inwardly therefrom a substantial distance between adjacent tube-sections for limiting the extent to which the tube may be depressed, substantially as described.

8. A tire having an outer tube and a plurality of resilient, non-inflatable, metallic tube-sections therein, said outer tube having a plurality of parts thereon each extending inwardly between a pair of adjacent tube-sections and each of said sections having a plurality of integral inwardly-turned teeth at each end thereof, substantially as described.

9. A tire having an outer tube, a plurality of resilient, non-inflatable, metallic tube-sections therein spaced apart around the tube, and means lying between said sections for limiting the extent to which said tube may be depressed, each of said sections being of cylindrical form and having integral, inwardly turned teeth at its ends, substantially as described.

10. A tire having an outer tube and a plurality of resilient, non-inflatable tube-sections therein, each of said sections being a sheet-metal cylinder having integral, inwardly turned teeth at each end thereof, substantially as described.

11. A tire having an outer tube and a plurality of resilient, non-inflatable, metallic tube-sections therein, each of said sections consisting of a single piece of metal of cylindrical form and of greater width on the tread side than on the opposite side and each having integral, inwardly extending teeth at its ends, substantially as described.

This specification signed and witnessed this 4th day of June, 1906.

JOSEPH C. TAYLOR.

Witnesses:
  I. McIntosh,
  D. J. Edmonds.